(12) United States Patent
Tamez et al.

(10) Patent No.: US 8,985,247 B2
(45) Date of Patent: Mar. 24, 2015

(54) FLUTED CUTTER ELEMENT AND METHOD OF APPLICATION

(75) Inventors: Reuben L. Tamez, College Station, TX (US); Christopher Leija, Spring, TX (US)

(73) Assignee: Dynalloy Industries, Inc., Houston, TX (US)

( * ) Notice: Subject to any disclaimer, the term of this patent is extended or adjusted under 35 U.S.C. 154(b) by 275 days.

(21) Appl. No.: 13/579,515

(22) PCT Filed: Feb. 25, 2011

(86) PCT No.: PCT/US2011/026289
§ 371 (c)(1),
(2), (4) Date: Aug. 16, 2012

(87) PCT Pub. No.: WO2011/106678
PCT Pub. Date: Sep. 1, 2011

(65) Prior Publication Data
US 2012/0315098 A1    Dec. 13, 2012

Related U.S. Application Data

(60) Provisional application No. 61/307,949, filed on Feb. 25, 2010.

(51) Int. Cl.
*B23B 27/14* (2006.01)
*E21B 10/46* (2006.01)
*B23B 27/16* (2006.01)

(52) U.S. Cl.
CPC ............... *E21B 10/46* (2013.01); *B23B 27/145* (2013.01); *B23B 27/1611* (2013.01); *Y10T 407/235* (2013.01); *Y10T 407/23* (2013.01)
USPC ........................................................ 175/430

(58) Field of Classification Search
CPC ............. Y10T 407/235; B23B 27/145; B23B 27/1611
USPC ..................... 175/379, 430; 407/113, 114, 42
See application file for complete search history.

(56) References Cited

U.S. PATENT DOCUMENTS

| | | | | |
|---|---|---|---|---|
| 2,959,842 A * | 11/1960 | Meyers | ........................... | 407/76 |
| 3,188,717 A * | 6/1965 | Heinlein | ......................... | 407/40 |
| 3,451,791 A | 6/1969 | Meadows | | |
| 4,869,329 A * | 9/1989 | Kar et al. | ........................ | 175/57 |
| 6,464,434 B2 | 10/2002 | Lynde | | |
| 6,902,354 B2 | 6/2005 | Satran | | |
| 7,909,544 B2 * | 3/2011 | Jansson | ........................... | 407/42 |

* cited by examiner

*Primary Examiner* — Giovanna Wright
(74) *Attorney, Agent, or Firm* — David B. Dickinson

(57) ABSTRACT

The present application presents a cutter element fabricated from a material harder than the surface to be cut having a fluted cube that continuously presents an acute angle to the cutter edge thereby prolonging the wear of the cutter as the cutter element wears. Six-sides of the cutter element can provide four, five or six fluted sides and the flutes can be parallel on opposing sides or could provide perpendicular flutes on each of the four, five or six sides. In an alternative embodiment, two of the six sides of the cube can be concave thereby providing a chip breaker indentation in the cube to remove cuttings from the surface being scrapped or cut.

6 Claims, 11 Drawing Sheets

FLUTED CUTTER ELEMENT AND METHOD OF APPLICATION

TECHNICAL FIELD

This is a hard-facing cutter element for use in industry; specifically a fluted cutter element which, when applied to a cutting implement surface, permits continued cutting to occur prior to wearing out and dulling to the point that the cutter element must be removed and the cutting implement resurfaced.

BACKGROUND ART

In many industries, such as mining, well drilling, and road construction where steel blades or implements are coming into contact with hard rock, the continual abrasion of the rock against the blade wears the blade down. This phenomenon has long resulted in the industry applying hard-facing to cutting implement surfaces which provide additional hardness to prevent excessive wear of the cutter element to thereby increase the useful life of the cutting or digging tool.

DISCLOSURE OF INVENTION

The cutter element claimed herein comprises a hardened cube having six substantially equal sides; and a flute formed on a plurality of the six substantially equal sides. Alternatively, the cutter element can provide the flute formed in at least four of the six equal sides or at least five of the six substantially equal sides. The cutter element having less than all six sides fluted can be fashioned with two of the sides being concave. The cutter element can also be fluted formed in each of the six substantially equal sides.

The cutter element of this disclosure is preferably formed from sintered tungsten carbide in a cobalt binder. Specifically, the cutter element is formed from tungsten carbide in a cobalt binder having a Rockwell A hardness of between 89 and 93; and, even more specifically, having a Rockwell A hardness of between 90.1 and 92.3. The cutter element can be formed from one or more of the following in a binding matrix: titanium carbide, tungsten carbide, tantalum carbide, vanadium carbide, or zirconium carbide.

Alternatively, the cutter element can provide a plurality of perpendicular flutes on each of the six equal sides or a perpendicular set of flutes on each of four opposing sides of the cutter element. A method of fabrication of the cutter elements can comprise the steps of forming the cutter elements into a rod; providing a pre-tinned source of cutter elements for deposition on a surface to be hard-faced; bringing the rod of cutter elements into contact with a heated surface of the surface to be hard-faced and melting the rod to release the cutter elements; and, attaching the cutter elements to the surface by use of standard attachment techniques, consisting of welding, brazing or soldering.

MODE(S) FOR CARRYING OUT THE INVENTION

Figure 1:
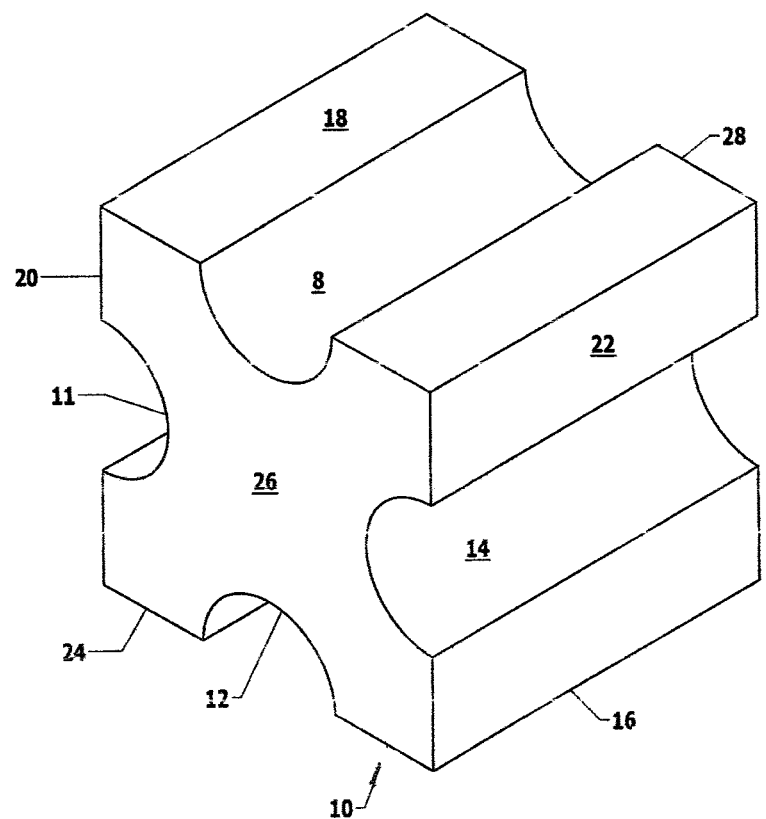
FIG. 1 is a perspective view of the cutter element of the present embodiment of the invention showing flutes on four of the six sides of the cube.

As previously noted, wear adversely effects all steel surfaces that scrape or cut across a surface. This surface can be rock in a subsurface bore or rocks in a farm field or on a road construction site, or even metals or other composite or cermet materials to be milled or cut through, such as the windowing of drill-string casing, the milling of down-hole plugs or slip, and the like. Continued use of the cutter will result in the need to change out the hard-faced metal implement that is being used for the cutting or scraping unless hard-facing, having a hardness greater than the material being cut or scraped, is placed on the surface to minimize the wear. Hard-facing has long been accomplished by coating the cutting or scraping element with hardened materials such as tungsten carbide in a matrix, typically of cobalt.

The Material

Tungsten carbide in a cobalt binder has long been used as a hard-facing material. Tungsten carbide is advertised in many grades. One vendor suggests that is there are at least 5,000 different grades of tungsten carbide sold under more than 1,500 different trade names by more than 1,500 different companies. While applicant cannot verify that this is correct, it should be acknowledged that many different grades and brands of tungsten carbide are available for use. A standard has been attempted using the "C" grade that describes the type of job or job characteristics of the tungsten carbide alloy. Conventionally, tungsten carbide vendors provide inserts with a higher cobalt matrix to provide more shock resistance. Conversely, a higher percentage of tungsten carbide will result in a cutter having a higher wear capacity, but a lower resistance to fracture. Grain size can also be manipulated to increase the wearing characteristics of the cutter insert, all in a manner well known to those in this industry. One preferred embodiment of the cutter element is formed from tungsten carbide in a cobalt binder having a Rockwell A hardness of between 89 and 93; and, specifically, having a nominal Rockwell A hardness of about 90.1. Another embodiment is formed with a cutter element formed with material having a nominal Rockwell A hardness of about 92.3.

In the manufacture of the fluted cutters of the present application, applicant will select a grain size of the tungsten carbide particles, and the percentage of matrix selected from cobalt, and perhaps titanium carbide and tantalum or niobium carbide to achieve the appropriate hardness and wear resistance, all in a manner well known in this industry or art. Most cutter element inserts used in the oil and gas industry have a 2-5 micrometer (μm) tungsten carbide grain size, with between 10.0-16.0% by weight of cobalt (Co). This composition will then be compressed and heated to achieve the final shape of the fluted cubes described herein in the drawings. Applicant expects the higher wearing tungsten carbide alloys will be more useful in the fabrication of the fluted cutter element of the present invention. A person of ordinary skill in this art would choose the exact grade based upon the cutting application requirements. The cobalt content would vary between 6 and 16 percent to meet the wear and impact resistance needed for varying conditions.

Shape of the Cutter Elements

The shape of the fluted cubes is intended to provide a maximum cutting surface face throughout the wear experienced on the cutter element and irrespective of the orientation of the fluted cutter element on the cutting tool. FIG. 1 shows a perspective view of one cutter element having four fluted sides 18, 20, 22, 24 of the six-sided cube that is made from a tungsten carbide in cobalt matrix mix described herein. Flutes 8, 11, 12, 14 nm parallel through opposing sides 18, 20, 22, 24 of the fluted cube cutter element 10 leaving two non-fluted sides 26, 28. The initial cutter edge 16 will be used in description of this cutter element, but it should be appreciated that any edge of the cutter element could be presented to the surface to be cut without departing from the spirit or intent of this disclosure. A plurality of these cutter elements 10 may be added on a cutting implement surface by direct hand or mechanical placement and by tacking; or they may be combined in a rod with a tinning binder that permits an applicator to rapidly weld the hard-facing on the surface to be covered in a random manner.

Figure 2:
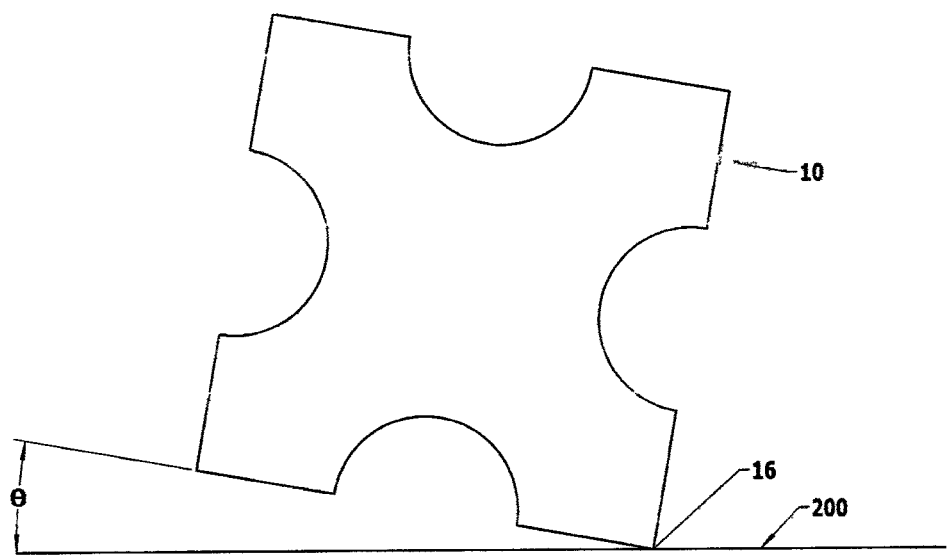
FIG. 2 is a cross sectional schematic view of an end of the cutter element as it commences contact with the surface of the work piece to be cut.

FIG. 2 is an end schematic view of the cutter element 10 of the present application as its leading cutter edge 16 contacts the surface 200 of the material to be cut. This surface 200 can be metal, such as an interior surface of a tubular or a workpiece held on a cutting or grinding table, or the surface could be rock, concrete, ceramic or other natural materials such as hardwoods, such as are found in a well bore or on a construction site. The surface 200 can thus describe any material to be cut or scraped by the cutter element's 10 edge 16, without limitation. It is expected that cutter edge 16 on cutter element 10 can be rotated to move across the surface 200 and therefore can move in a helical or circular manner rather than in a longitudinal manner. If the cutter element 10 is welded to a cutting surface with an angle θ, the angle presented at cutter edge 16 is 90° minus θ (90°−θ), thereby presenting a cutter angle that bends the cut portion of the surface back toward itself For example, assuming the cutter element has a rake angle as shown in FIG. 2 as installed, on the cutting surface is only slightly oblique, the leading edge still provides an angle of 90° less the rake angle θ causing any cuttings to be curled back and break off during the cutting process. Even if no rake angle is experienced by the cutter element (i.e., if one side of the cube sits flat on the cutting implement surface), the wear on the front edge will still cause the following flute to assist in the flaking of the cut from the surface of the cut or scraped surface.

Figure 3:
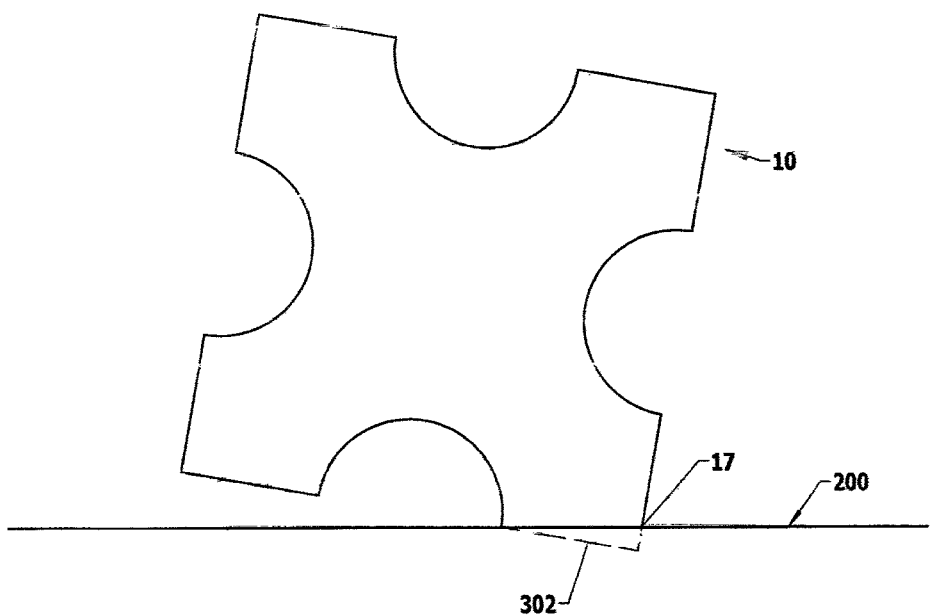
FIG. 3 is a cross sectional schematic view of an end of the cutter element as it contacts and commences cutting the surface of the work piece to be cut.

FIG. 3 shows the cutter element 10 after it has experienced wear showing the loss of cutter material shown in the triangular shaped area 302 while still providing sharp edge 17, which rakes the surface and continues cutting. The worn portion 302 of the cutter is shown with a dashed profile in FIG. 3. In each of the following figures, the worn portion of the cutter element is shown in the dashed profile. The remaining portion of the cutter element engages the surface to be cut 200 in each figure. Irrespective of the wear on each cutter element, there remains a chip-breaking angle between some portion of the cutter element and the work piece 200.

Figure 4:
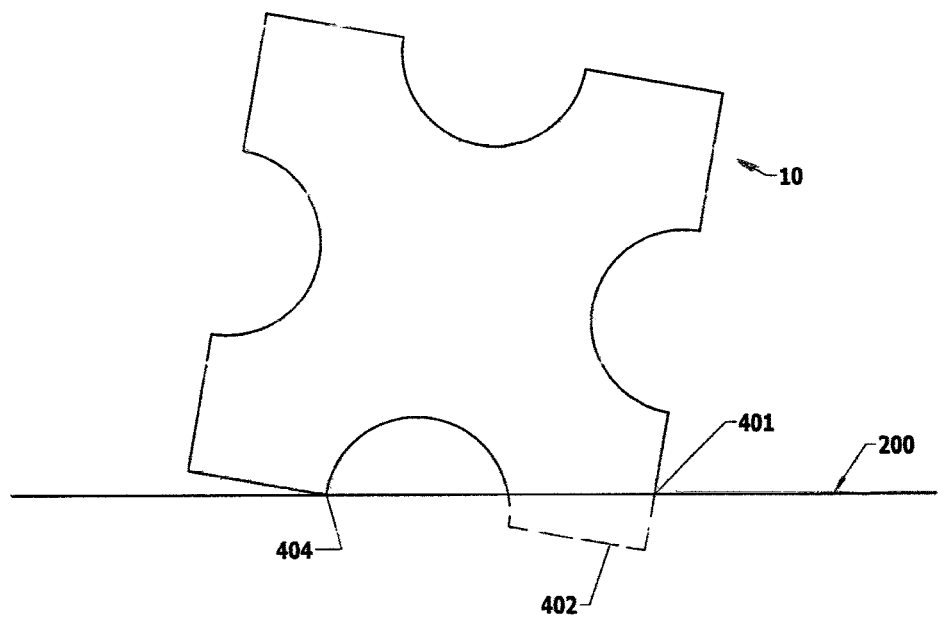
FIG. 4 is a cross sectional schematic view of an end of the cutter element as it continues in contact with the surface of the work piece to be cut, and the following edge of the flute comes into contact with the following surface of the work piece to be cut, thereby increasing the amount of cutting contact being accomplished by one cutter element.

FIG. 4 shows the cutter element 10 after it has experienced even more wear 402 than shown in FIG. 3 such that leading edge 401 of FIG. 4 engages the surface to be cut or scraped 200, but—after wear—also engages a second cutter surface 404 on the following edge of the fluted surface which also acts to cut the surface 200. This permits the cutter element 10 to continue to cut even after significant wear of the tungsten carbide alloy cutter element 10. As previously noted, other metallic carbides could reasonably be substituted herein without departing from the spirit of this disclosure.

Figure 5:
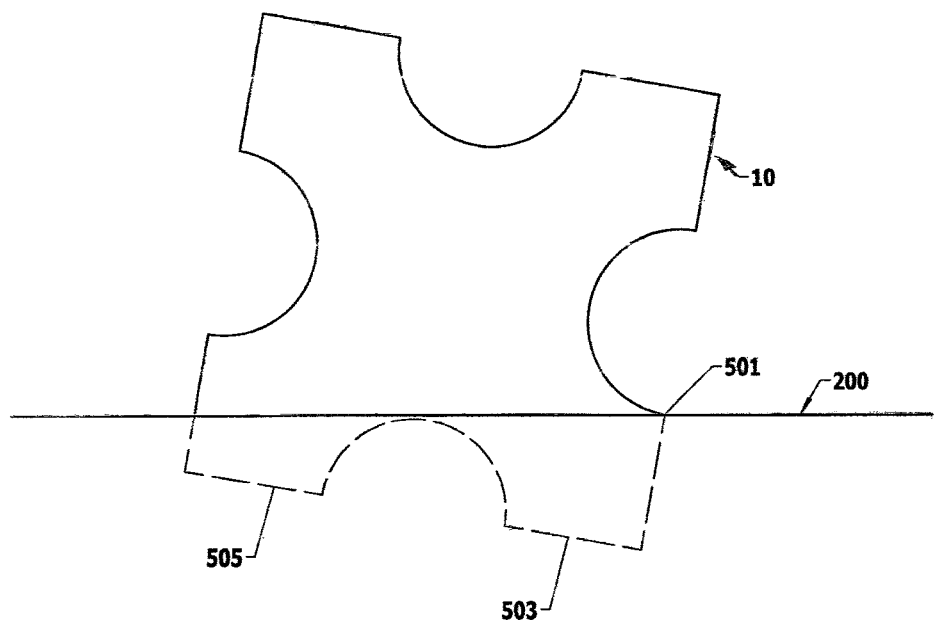
FIG. 5 is a cross sectional schematic view of an end of the cutter element as it is worn down during cutting, until the leading edge of the cutter element again presents an oblique cutting angle to break chips away from the cutter surface.
Figure 6:
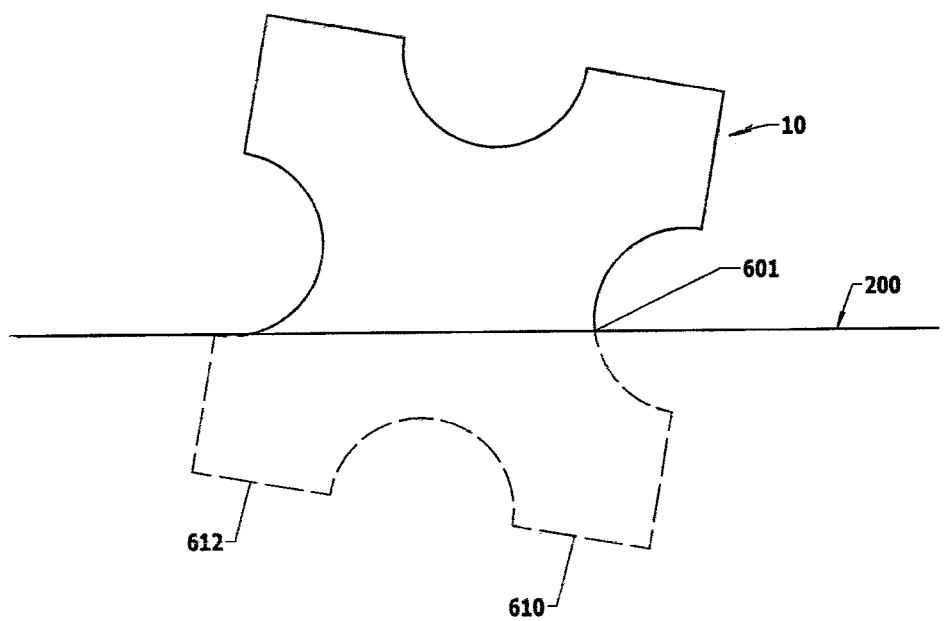
FIG. 6 is a cross sectional schematic view of an end of the cutter element as it is worn down during cutting until the leading edge of the cutter element again becomes raked forward to cut more efficiently throughout the wear cycle of the cutter element.
Figure 7:
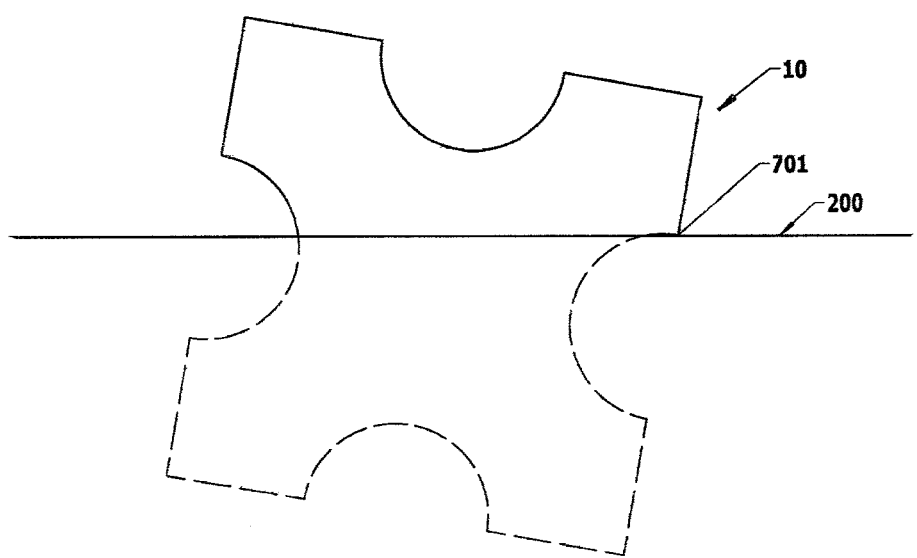
FIG. 7 is a cross sectional schematic view of a well worn cutter element which still presents sharp edges for cutting of material at the surface of the work piece.
Figure 8:
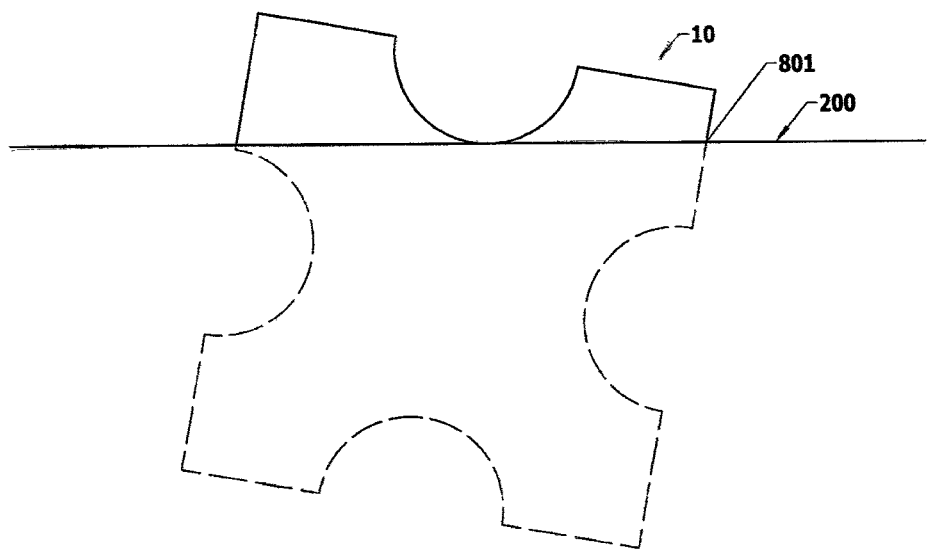
FIG. 8 is a cross sectional schematic view of a worn cutter element which is still capable of removing material from the surface of the work piece even though substantially all of the body of the cutter element has been worn away.

Similarly, as shown in FIG. 5, as the wear from continued cutting or scraping is experienced by cutter element 10, the wear of the cutter on the leading edge 501 completely removes the hardened tungsten carbide alloy surface 503 and trailing portion 505 of the cutter element, but still presents cutter edge 501 which continues to cut or scrape the surface 200. Similarly, as shown in FIG. 6, as lobes 610 and 612 are worn off cutter element 10 as it continues to cut or scrape the surface 200, acute cutter edge 601 is presented to the surface to continue removing material from the surface 200 without wearing down as most present cutter elements do after extended use. Even as the last vestige of the cutter element 10 is shown in FIGS. 7 and 8, cutter edges 701 and 801 are presented to the surface 200 permitting even excessively worn element 10 to continue cutting and scraping the surface 200.

Figure 9:
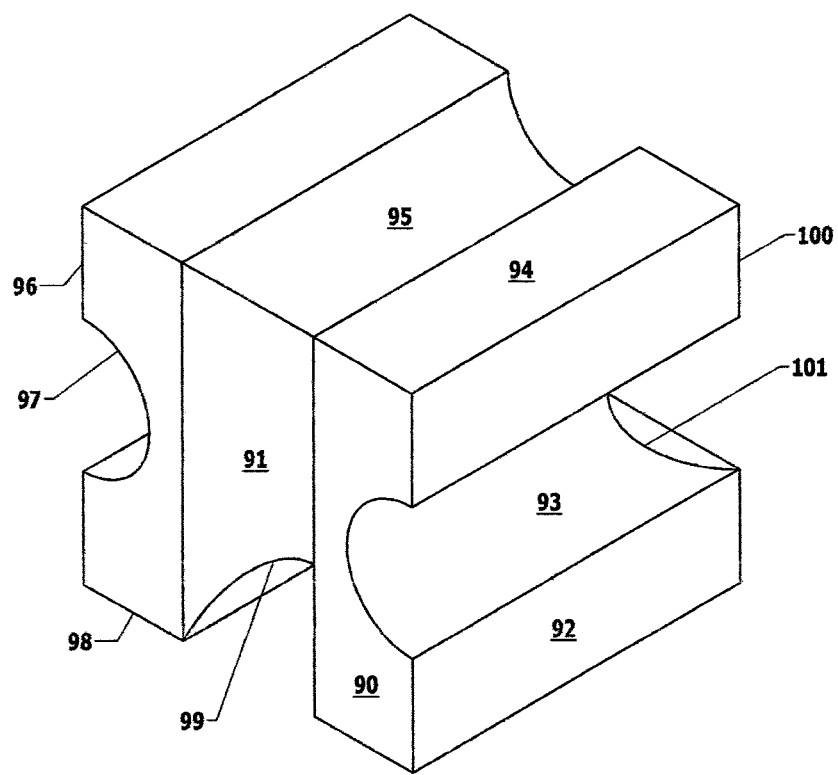
FIG. 9 is a perspective view of the six-sided cube of the present invention having a fluted surface on each of the six faces of the cube.

FIG. 9 is an alternative embodiment of the present application providing a six-sided cube having each side 90, 92, 94, 96, 98, 100 with a fluted surface 91, 93, 95, 97, 99, 101. Irrespective of the angle of welding to the cutting implement surface, is the cutter element 10 will always present a sharp cutter element surface notwithstanding the level of wear of the cutter element, thereby increasing the useful service life of the cutting implement even after substantial wear has been experienced on the cutter elements.

Figure 10:
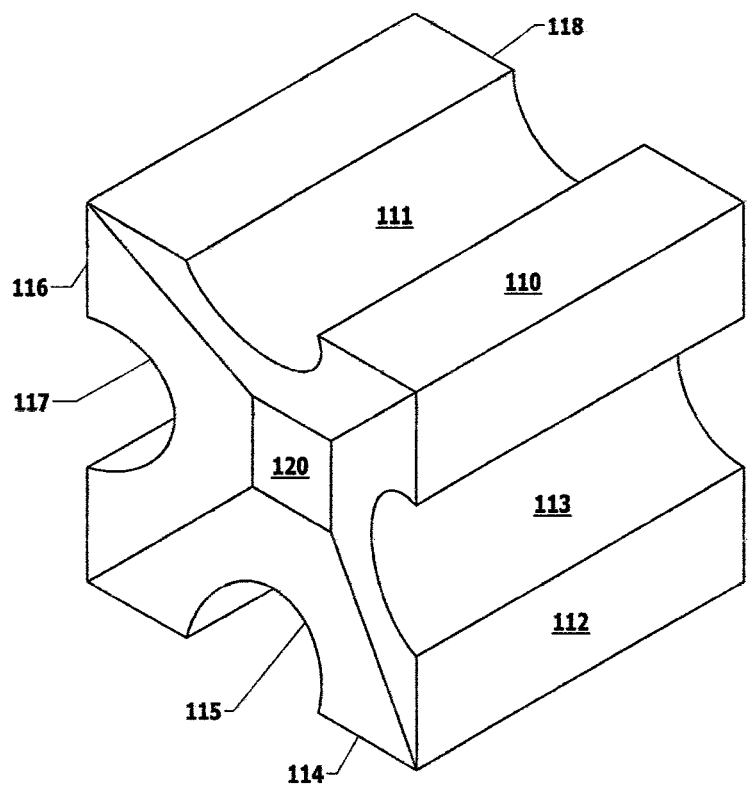
FIG. 10 is a perspective view of an alternative six sided cube of the present invention having concave opposing surfaces on two of the four sides of the fluted cutter cube to efficiently break chips away from the work piece as the cutting takes place.

FIG. 10 is another alternative embodiment of the present application providing a cutter element 11 providing four fluted sides 110, 112, 114, 116, four flutes 111, 113, 115, 117 and two concave surfaces 118, 120 for chip breaking.

Figure 11:
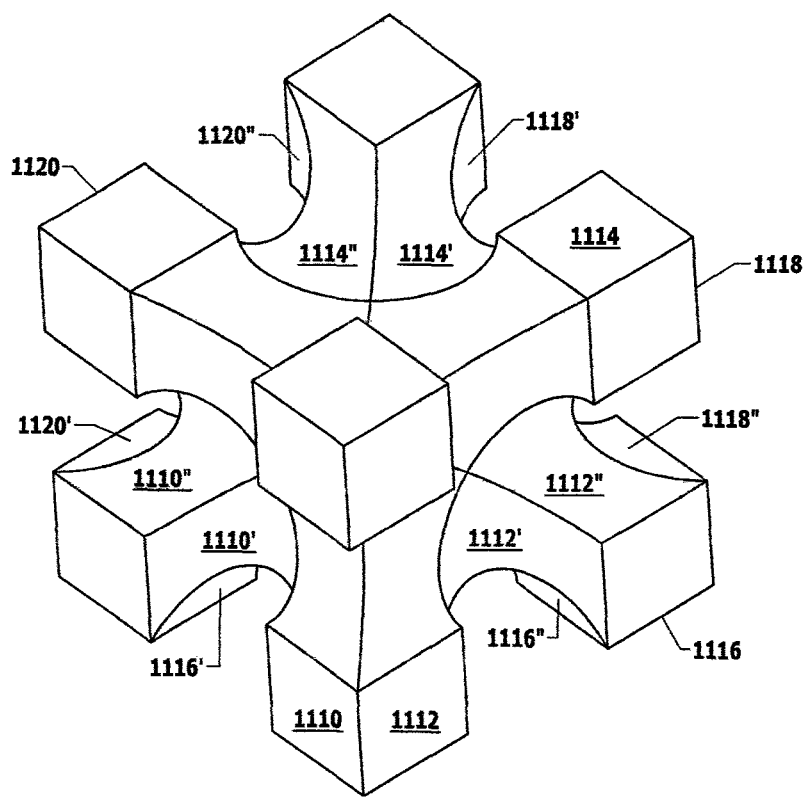
FIG. 11 is a perspective view of an alternative embodiment of the present invention showing perpendicular flutes on each side of the six-sided cube.

FIG. 11 shows another alternative embodiment disclosing perpendicular fluting on each of the six sides of the cube presenting a castellated cutter element, which presents a cutter edge irrespective of the placement of the cutter element on the cutting implement surface. Face 1110 of cutter cube 1119 (which includes all four exterior surfaces on this side of the cutter element) presents flutes 1110' and 1110". Similarly, face 1114 (including all four exterior faces on this face) presents flutes 1114' and 1114". Face 1112 of cutter cube 1119 (again including the four exterior faces of 1119 in FIG. 11) presents flutes 1112' and 1112". Face 1116 (shown on the bottom of 1119 as presented in FIG. 11) presents flutes 1116' and 1116". Face 1118 on the posterior face of the cutter cube 1119 presents flutes 1118' and 1118". Finally, hidden face 1120 provides perpendicular flutes 1120' and 1120" on the posterior surface of cutter element 1119 shown in FIG. 11. Each fluted surface, irrespective of the manner in which it is positioned in the cutting surface of cutter cube 1119, will present a cutting surface that persists throughout the wear on the cutter element extending the service life of the cutting element even under the harshest conditions.

Numerous embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What is claimed is:

1. A cutter element comprising:
    a hardened cube formed from a carbide in a cobalt binder having six substantially equal planar sides;
    a first edge to edge single bisecting flute formed on three of the six substantially equal planar sides of the hardened cube; and,
    a second edge to edge single bisecting flute formed on the remaining three sides of the six equal planar sides oriented perpendicular to the first edge to edge bisecting flute.

2. The cutter element of claim 1 wherein each single bisecting flute formed edge to edge on the hardened cube in any of the six substantially equal planar sides is substantially semi-circular.

3. The cutter element of claim 1 wherein the hardened cube is formed from at least one of the following in a binding cobalt matrix:
    tungsten carbide, titanium carbide, tantalum carbide, vanadium carbide, or zirconium carbide.

4. A method of installing the cutter element of claim 1 for ease of application comprising:
    forming a plurality of fluted cutter elements into a rod providing a pre-tinned source of cutter elements for deposition on a surface to be hard-faced;
    bringing the rod of fluted cutter elements into contact with a heated surface of the surface to be hard-faced and melting the rod to release the cutter elements; and,
    attaching the fluted cutter elements to the surface by use of standard attachment techniques.

5. The method of claim 4 wherein the standard attachment technique is welding.

6. The method of claim 4 wherein the standard attachment technique is brazing.

* * * * *